C. DONALDSON.
LIGHT FOR VAULTS, VESSELS, &c.
No. 22,069. Patented Nov. 16, 1858.
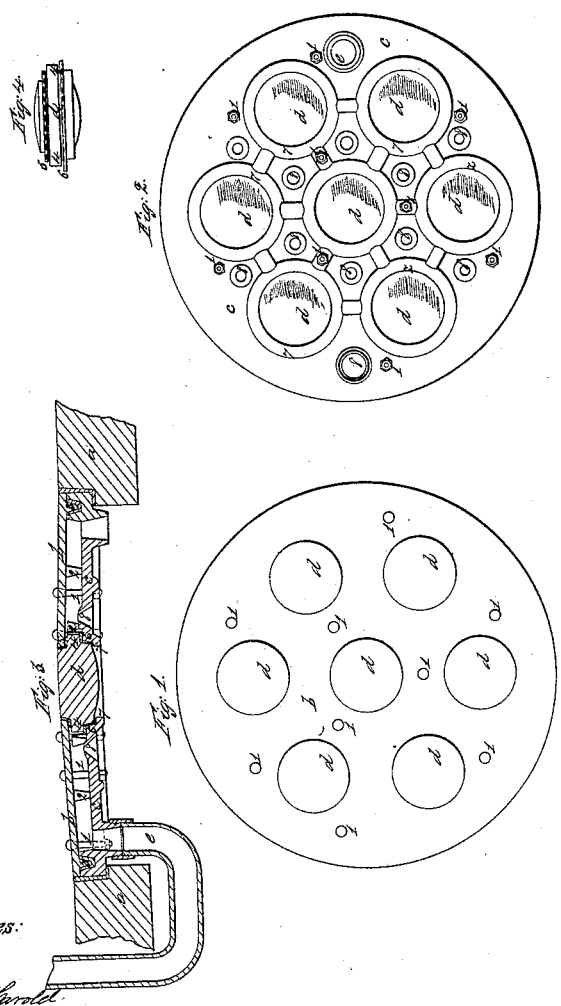

UNITED STATES PATENT OFFICE.

C. DONALDSON, OF NEW YORK, N. Y.

VAULT-LIGHT.

Specification of Letters Patent No. 22,069, dated November 16, 1858.

*To all whom it may concern:*

Be it known that I, CORNELIUS DONALDSON, of the city and State of New York, have invented, made, and applied to use certain new and useful Improvements in Lights for Vaults, Vessels, &c.; and I do hereby declare that the following is a full, clear, and exact description of the construction and operation of the same, reference being had to the annexed drawing, making part of this specification, wherein—

Figure 1 is a plan of my vault light or cover. Fig. 2 is an inverted plan of the same. Fig. 3 is a vertical section and Fig. 4 is a side view of one of the lights detached.

Similar marks of reference denote the same parts.

Various devices have heretofore been made for illuminating vault covers, platforms, deck lights, &c., and glasses of various sizes have been inserted into metal frames.

My invention therefore does not consist in an illuminating vault cover but it does consist in the manner of forming the illuminating glasses and securing them in place between two metallic plates, having openings to receive the glasses.

In the drawing *a*, is the curb, platform, floor, deck or other place receiving the light or cover which is to be of any desired size or shape. The light is formed by the upper plate *b*, and lower plate *c*, which are to be attached together by screws 1, 1, after the glasses are in place and the two plates are kept apart by blocks or lugs 2, 2, and a rib and groove 3, 3, complete the connection of one plate to the other. Openings are provided at the desired position or positions in the plates *a* and *b*, so that the holes in the plates coincide with each other.

*d*, is the glass fitted into each of the openings in the plates (*b* and *c*). These glasses are formed in the manner shown with a rim or flange 4, around the same. See Figs. 3 and 4. The manner of fitting these glasses in place is as follows: A ring of india rubber, gutta percha or equivalent material is placed against each side of the flange 4, and each glass then fitted is introduced into the openings to be filled in either plate *b* or *c*; the opposite plate is then put on and screwed tightly in place. It will thus be seen that the flange 4, is between the two plates *b*, and *c*, and that the rings of rubber (5 and 6) between said flange and the plates makes a perfectly water tight joint; and in case of any glass being broken the same can be repaired with great facility. If the flange 4, should crack off by a blow the glass will rest and be temporarily supported by the bearing 7. See Fig. 3.

The introduction of the flanges 4, 4, of the glasses leaves a space that can be used for ventilation, and for this purpose the under plate is to be perforated as at 8, 8, which will allow air to circulate between the plates, particularly if a pipe (*e*,) be led away to a higher elevation.

I do not claim a vault light formed of several glasses set in a frame, as one or more glasses have heretofore been used; neither do I claim a double vault cover or roof with perforations in the lower plate or a pipe connected with the space thus formed as the same is believed to be the invention of another party, but

What I claim as my invention and desire to secure by Letters Patent, is—

The annular flange 4, on each glass *d*, in combination with the supporting plates *b*, and *c*, and the ring packings of rubber or equivalent material, in substantially the manner specified.

In witness whereof I have hereunto set my signature this twenty sixth day of June, 1858.

CORNELIUS DONALDSON.

Witnesses:
LEMUEL W. SERRELL,
THOMAS G. HAROLD.